June 19, 1923.
W. LINK
1,459,336
TESTING DEVICE FOR FLASH LIGHT BATTERIES AND LAMPS
Filed Oct. 21, 1921
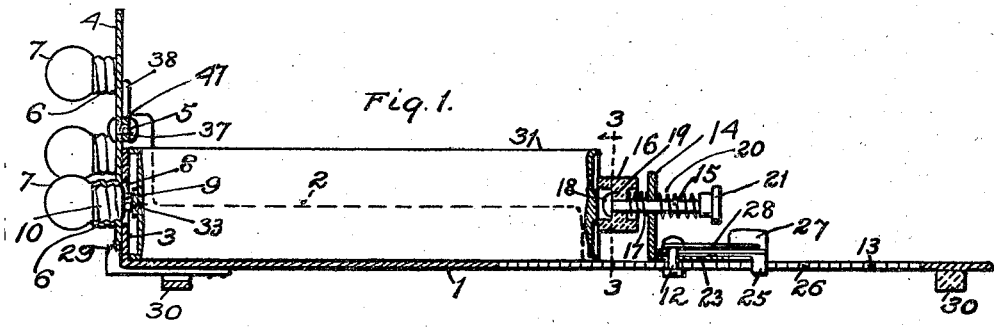
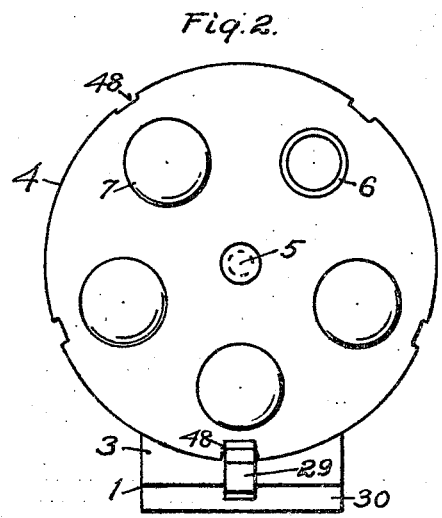
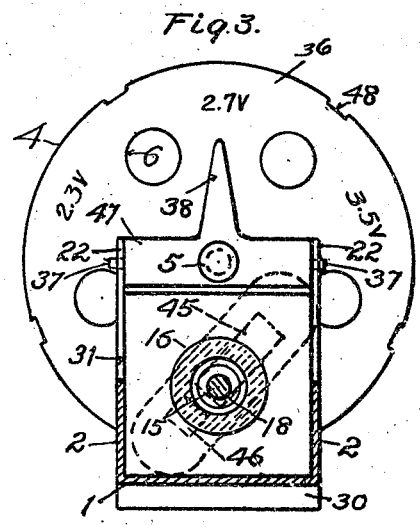
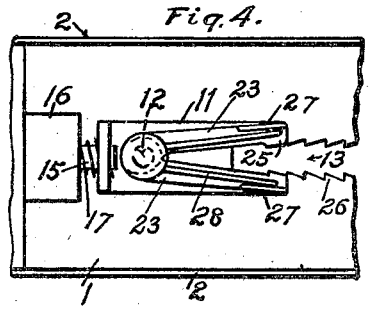
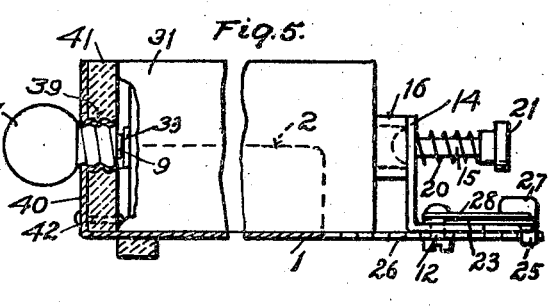
INVENTOR.
Walter Link
BY Arthur P. Knight
ATTORNEY.

Patented June 19, 1923.

1,459,336

UNITED STATES PATENT OFFICE.

WALTER LINK, OF AJO, ARIZONA.

TESTING DEVICE FOR FLASH-LIGHT BATTERIES AND LAMPS.

Application filed October 21, 1921. Serial No. 509,350.

*To all whom it may concern:*

Be it known that I, WALTER LINK, a citizen of the United States, residing at Ajo, in the county of Pima and State of Arizona, invented a new and useful Testing Device for Flash-Light Batteries and Lamps, of which the following is a specification.

This invention relates to means for testing batteries and lamps such as are used in flashlights, and the main object of the invention is to provide a device which will test the batteries and lamps under the identical conditions of use, without introducing any extraneous contacts or connections such as are unavoidably present when the usual testing devices including cords and indicating instruments are used.

A further object of the invention is to provide a device for the stated purpose which will be of extreme simplicity in construction and convenient and effective in operation.

The accompanying drawings illustrate embodiments of my invention and referring thereto: Fig. 1 is a longitudinal-vertical section of the device. Fig. 2 is an end elevation thereof. Fig. 3 is a vertical section on line 3—3 in Fig. 1. Fig. 4 is a partial plan view of the rear portion of the device. Fig. 5 is a partial vertical section showing a modified form of the invention.

The device comprises a base member or battery support 1 formed preferably as a rectangular channel or trough, having vertical side walls 2, which are adapted to embrace and engage a flashlight battery or cell, of ordinary size, or the carton containing such battery or cell. At its front end, the member 1 is provided with a vertical wall 3, and with means for mounting or supporting an electric light bulb. For convenience in testing batteries and lamps of different size or power, I prefer to provide on the device a movable mounting for a number of lamp bulbs, said mounting comprising a disk 4 pivoted at 5 on a plate 47 hinged at 37 on brackets 22 and provided with a plurality of screw sockets 6, into which may be screwed lamp bulbs indicated at 7, the inner ends of said sockets open and being adapted to register with an opening 8 in the wall 3, so that the center contact 9 of each lamp bulb may be exposed at such opening for testing purposes. Base member or battery support 1 and lampholder 4 are of metal, so that the screw terminal 10 of each lamp bulb 7 is in electric connection, through the lampholder, with said battery support. A spring catch 29 on base 1 may engage any one of a series of notches 48 in disk or lampholder 4 to hold the same in position in which a lamp 7 therein is opposite opening 8, said spring catch also serving to hold disk 4 flat against wall 3. On releasing catch 29 and tilting disk 4, the center terminal 10 of the lowest lamp is swung clear of the wall 3 and the disk may then be turned to bring another lamp 4 into position and then swung back into engagement with catch 29.

The battery support 1 is also provided with means for longitudinal engagement with the battery or cell, to hold said cell in position therein. For this purpose a clamping member or slide member 11 may be mounted to move longitudinally on the support 1, being guided by engagement of a pin 12 on said member 11 in a longitudinal slot 13 in said support, said member 11 being further provided with an upright member or standard 14 through which extends a circuit closing push pin 15. An insulating sleeve 16 is mounted slidably on the pin 15, and is pressed forward by a spring 17, such forward movement being limited by a head 18 on the push pin 15, engaging with a shoulder 19 on said sleeve. A spring 20 extends around the push pin 15 and between the standard 14 and a push button or head 21 on the push pin 15, so as to tend to hold said push pin and the attached parts away from the front end of the device. Suitable means are also provided for adjustably holding the slide member 11 in position on the battery support 1. For this purpose said slide member may be provided with catches 23 pivoted at 12 on the slide member 11 and having depending lugs 25 adapted to engage ratchet teeth 26 on the edges of the slot 13 in the battery support 1, said catches being also provided with thumb pieces 27, whereby they may be pressed together to release the lugs 25 from said ratchet teeth. Springs 28 engaging with the thumb pieces 27, serve to hold said catches outwardly so as to cause engagement of the lugs 25 thereon with the said ratchet teeth.

The device may be provided with cleats 30 on its under face to support it, said cleats being for example of leather or other material adapted to prevent marring of the surface on which the device rests; or if desired, the device may be fastened in fixed position.

The device is used as follows:

To test battery or dry cell, the clamping member or slide 11 is moved back sufficiently to permit insertion of the cell with or without the enclosing carton, and such cell, indicated at 31 is then slipped into position within the trough or channel of battery support 1, and the clamp or slide member 11 then moved forward to bring the sleeve 16 thereon against the rear end of the cell so as to retain the latter in position, the cell being thereby clamped between the sleeve 16 and the front wall 3 of the device. In the forward movement of the slide 11 it is only necessary to push the said slide forward, the catch lugs 25 slipping over the ratchet teeth 26 in this operation and the spring 17 ensuring tight engagement of the sleeve 16 with the battery or cell, said spring pressing forward against the sleeve 16 and backward against the upright 14, which is held rigidly in position by reason of engagement of the lugs 25 on the catches 23 with the ratchet teeth 26. At this time, the head 18 on the circuit controlling push pin 15 is held out of contact with the rear terminal or contact 32 of the battery or cell by the operation of spring 20. The forward terminal or contact 33 of battery or cell extends at this time within the opening 8 in the front wall 3 and into contact with the center contact 9 of the lamp bulb which for the time being is in register with said opening, it being understood that the lamp bulb so inserted or brought to registering position will be of the power or capacity corresponding to the battery to be tested. The provision of the rotary lampholder 4 enables any one of the several different lamps carried thereby to be brought to testing position and in practice it is desirable to provide on such support a set of lamps of different power and to provide on the rotatable lampholder 4 suitable marks indicating the power or capacity of the respective lamps. For convenience these designating marks are preferably provided on the rear face of the rotatable lampholder 4, as indicated at 36, and hinged plate 47 on the base or channel member 1 may be provided with a pointer portion or index indicated at 38, which points to the mark on the member 4 corresponding to the lamp which is at that time in registering position at opening 8. One of the sockets 6 on the rotatable carrier 4 may be left blank or unoccupied so as to receive a lamp to be tested. Assuming that the battery or cell is in position for testing as above described, the testing operation is performed by pushing forward the push button 21, so as to bring the head 18 on push pin 15 in contact with the rear terminal 32 of the battery or cell, the circuit then being completed from said rear terminal through said head 18, push pin 15, and standard 14 to the base 1 thence to front plate 3, lampholder 4, socket 6, and screw terminal of the particular lamp which is in position within said socket, thence through the filament of the lamp to the center terminal 9 thereof and the front terminal 33 of the battery. Proper illumination of the lamp then indicates that the battery is in working condition. It will be seen that in this operation there are no extraneous contacts or connections introduced other than those which correspond to similar contacts in the flashlight in which the battery is to be used. In testing flashlight batteries it is usual to connect the battery by means of flexible cords and terminals to suitable instruments, and in such an operation, failure of the apparatus to indicate current may be due to defects in the connections or instruments, but with the device above described there is no such source of error, the conditions of the test being identical with those which exist in the flashlight itself.

If a lamp is to be tested, a battery of proper strength will be inserted in the supporting or base member 1 and the lamp screwed into one of the sockets in the carrier 4 and brought into contact with the front terminal of the battery, the test operation being then effected by pushing forward the button 21 as above described.

In the simplified form of my invention shown in Fig. 5, only a single socket 39 is provided, said socket being in fixed position on the upright front wall 40 of base member 1, which is provided with an insulating backing 41 secured to the wall 40 by screws or rivets 42. Using this form of the invention, the lamp to be used in testing or to be tested is inserted in the socket 39 and the front battery or cell brought into position in the base 1 with its front terminal contacting with the central terminal of said lamp, in the same manner as above described.

My device may also be used for testing flashlight batteries or cells of the flat type, for example, by placing such a battery or cell within the channel member or battery support 1 in the position indicated in dotted lines in Fig. 3. Such batteries are provided with two resilient contacts or terminals at one end and when placed on the support 1 in this manner, one of said terminals indicated at 45 may be made to contact with the center terminal 9 of the lamp and the other resilient terminal indicated at 46 may be made to contact in the form of the invention shown in Fig. 1, with the end wall 3; or, in the form of the invention shown in Fig. 5 with one of the fastening pins or screws 42 so as to complete the circuit.

As shown in Figure 5, the insulating block 16 may be secured directly on the standard 14, the resiliency of the latter providing for the tight engagement with the battery as required.

What I claim is:

1. A testing device for flashlight batteris and lamps comprising a base member having an upwardly extending member thereon provided with means for supporting an electric lamp, and for connecting one terminal of said lamp to said base member, a clamping member slidingly mounted on said base member and adapted to engage a battery or cell to hold the same between said clamping member and said upwardly extending portion of the base member in such position that a terminal of the battery or cell will contact with a terminal of the said electric lamp, and manually controlled means on said clamping member for closing electric connection from the other terminal of the battery to said base member.

2. In a flashlight battery tester, a base member for supporting a battery, a lamp support movably mounted on said base member and provided with means for holding a plurality of lamps, and adapted to bring any one of said lamps into connection with a terminal of a battery supported on said base member.

3. A testing device for flashlight batteries and lamps comprising a battery support, a lampholder rotatably mounted on said battery support and provided with screw sockets for holding a plurality of lamps, and for connecting the screw plugs of said lamps to said battery support, said battery support being provided with means for supporting a battery in such position that a terminal thereof may contact with a center terminal of an electric lamp on said lampholder, when the lampholder is turned to bring said lamp opposite said battery terminal, a clamp member adjustably mounted on said battery support and adapted to engage the battery to hold same in position on the said support, and a circuit closer mounted on said clamp member and movable into and out of contact with the other terminal of said battery.

4. A testing device as set forth in claim 3 and provided, in addition, with means on said rotary carrier for indicating which one of the lamps is in connection with the battery.

5. A testing device for flashlight batteries and lamps, comprising a battery support provided with means for engaging one end of a battery and with conducting means connected to the battery support and having a screw socket for supporting a lamp in position to connect by its central terminal with a terminal at that end of the battery, and a clamp member slidably mounted on said battery support and adapted to engage the other end of said battery and provided with means for manually controlling connection from said battery support to the battery terminal at said other end of the battery.

6. A testing device as set forth in claim 5 and comprising in addition, spring means tending to hold said manual controlling means in open circuit position.

In testimony whereof I have hereunto subscribed my name this 14th day of October, 1921.

WALTER LINK.